United States Patent Office 3,459,606
Patented Aug. 5, 1969

---

3,459,606
FLUXES FOR SOFT SOLDERING
Hugo H. Becker, Chicago, Ill., assignor to Lake Calumet Smelting Co., Chicago, Ill., a corporation of Illinois
No Drawing. Filed July 5, 1966, Ser. No. 562,495
Int. Cl. B23k 35/36
U.S. Cl. 148—23                                    3 Claims

---

ABSTRACT OF THE DISCLOSURE

A soldering flux which contains rosin, and preferably fatty acid in the form of an amine or ammonium soap decomposes at soldering temperature to give volatile amine or ammonia respectively, and to leave a water-impervious, protective film of rosin.

---

This invention relates to formulations of soldering fluxes for use in high speed automatic applications as well as in hand and semi-automatic applications that retain the corrosion inhibiting features of rosin based fluxes, while eliminating their undesirable properties.

Since time immemorial, rosin in organic solvents have formed the active bases in so called non-corrosive soldering fluxes, principally because the residues after soldering are highly non-hydroscopic and form barriers against moist air. In the soldering of electrical connections the residual rosin is highly non-conductive and remains so for long periods of time.

In modern high speed soldering operations rosin fluxes alone generally do not adequately clean the tarnished surfaces of the base metals to form void free bonds with the solders. In soldering plated metals, such as tin plated steel used for containers, the thickness of the coating has been reduced to a point where straight rosin fluxes are no longer effective.

In order to enhance the fluxing power of the rosin, additions are made of organic acids, such as oleic, citric, and the like, or hydro halides in the form of neutral salts. While these are designed to break up into volatile components during the soldering operations to leave no residual acids, the volatile, free acids react with the base metals to leave corrosive metal halides. If these halides are adequately covered with a moisture barrier, atmospheric corrosion is effectively inhibited.

It is obvious from this that rosin is a desirable constituent of soldering fluxes whenever removal of the flux residues is uneconomical. In addition, rosin of the proper specification also provides a cover for the base metal and molten solder during the soldering operation to prevent oxidation of the metal surfaces.

There are serious disadvantages, however, to the use of rosin in fluxes. The incompatibility of rosin and water is a desirable feature in forming a moisture barrier against atmospheric corrosion, but it limits the amount of water soluble salts that may be combined without segregation from rosin in polar organic solvents.

Rosin solutions are highly viscous, building up on machine parts, and as the solvent evaporates, leave a hard residue very hard to remove. Rosin solutions have a high surface tension, limiting spread on the base metal, especially in capillaries such as those in lock and lap seams which results in voids in the interface between solder and base metal.

In the present formulation, the rosin and fatty acids are converted into soaps soluble in water as well as in organic solvents. The rosin soaps in solution are compatible with a wide variety of water soluble halide salts without segregation of either. In addition, as a soap, the rosin is soluble in alcohol and other polar organic solvents with boiling points in a range suitable for the heating conditions of most soft soldering operations. As a soap, the rosin acts as a lubricant whenever the fluxed piece comes in contact with movable parts, and any buildup of such soap is readily removed with mild water or alcohol cleaning solutions avoiding buildup at those points common to rosin solutions.

Wetting of the surface to be soldered by the flux is a function of prime importance particularly in the interstices formed by lock and lap seams, the most common method of forming soldering joints. High surface tension of rosin alcohol solutions inhibit capillary rise. The greatly reduced surface tension of the rosin soap flux facilitates wetting of these areas. Thus the rosin soap is a wetting agent of itself and fatty acid soaps, such as amine-oleates are added to further improve wetting.

This rosin soap flux will decompose or break up on heating it to soldering temperature, releasing volatile ammonia or amines, and leaving the rosin to provide a cover for the solder and base metal during the soldering operation and forming a moisture barrier after the soldered joint is completed.

The components or combinations to produce this formulation include a rosin capable of forming a soap with a base highly soluble in water and polar organic solvents. This rosin is heated to temperatures below the melting point of the solder, to form a cover over the molten solder and base plate during the soldering operations, but its boiling point and decomposition temperatures must be substantially above the optimum soldering temperature. The base is a volatile amine or ammonia at the soldering temperature so that no residue remains on the plate. Long chain fatty acids are chosen to form surfactants with the ammonia or the amines.

A type example contains 10% to 30% rosin and from 2% to 20% oleic acid in a suitable solvent. These fluxes have done a satisfactory job in many instances, but as the base metals are modified in the interest of lower cost, additions of inorganic hydro halides are necessary which release acids upon heating that act on the tarnished surface of the base metals. This flux may include 1% to 5% monoethanol amine hydrochloride in a suitable solvent. This type of flux leaves corrosive halide salts which are best inhibited by a moisture barrier formed by the residual rosin.

A typical formulation or combination which has been effectively used comprises the following proportions by weight:

|  | Parts |
|---|---|
| Water white gum rosin | 15 |
| Oleic acid | 1 |
| Ammonium hydroxide and amines | 5 |
| Monoethanol amine hydrochloride | 2 |
| Isopropyl alcohol | 75 |
| Water | 2 |

The formulation procedure in producing this combination is: crush the rosin into pieces ⅛ of an inch or less and dissolve in the alcohol; heat the rosin alcohol mixture to 125° F., if necessary, to expedite forming a solution.

When the rosin is in complete solution, add the oleic acid and ammonia thereto, and stir; mix concentrated hydrochloric acid with the monoethanolamine under adequate ventilation. Before adding the monoethanolamine hydrochloride to the previous mixture check it for pH (acidity); if the pH is more than 8 add hydrochloric acid slowly until the pH is between 7 and 8. If the pH is less than 7 add monoethanolamine until it is between 7 and 8. Add the water and mix with other ingredients, making the combination ready for use.

In this formulation amines may be substituted or combined with ammonium hydroxide to make up the 5 parts of the formula. Slightly more or less than 2 parts of water may be required if only amines or anhydrous acid are used.

This formula should be regarded as an example of a flux to obtain the desired properties for the objectives claimed, as other slight changes in the quantities and known ingredients may be incorporated without departing from the spirit and scope of the invention.

I claim:

1. A rosin flux combination comprising an admixture of the ingredients: water white gum rosin in an amount from 10% to 30% by weight; oleic acid in an amount from 2% to 20% by weight; ammonium hydrate in an amount sufficient to convert said rosin and oleic acid into soap; monoethanol amine hydrochloride in an amount from 1% to 5% by weight; and solvent selected from the group isopropyl alcohol, and water, said solvent being present in an amount sufficient to dissolve said ingredients.

2. A rosin flux mixture consisting of the following ingredients substantially in the quantities shown:

|  | Percent |
|---|---|
| Water white gum rosin | 15 |
| Oleic acid | 1 |
| Member selected from the group: | |
| Ammonium hydroxide and amines | 5 |
| Monoethanol amine hydrochloride | 2 |
| Isopropyl alcohol | 75 |
| Water | 2 | all intimately mixed together.

3. In a flux containing a rosin capable of forming a soap, said flux comprising said rosin in an amount from 10%–30% by weight based on the weight of the flux, 2–20% long chain fatty acids, a base constituent and the balance consisting essentially of a solvent selected from the group consisting of water and polar organic solvents, the improvement wherein said base constituent is highly soluble in water and polar organic solvents, said base being selected from the group consisting of volatile amines and ammonia, and being present in an amount sufficient to convert said rosin and said fatty acid to a soap.

References Cited

UNITED STATES PATENTS 3,205,052 9/1965 Downing _____ 148—25
3,266,949 8/1966 Groves et al. _____ 148—25

L. DEWAYNE RUTLEDGE, Primary Examiner

T. R. FRYE, Assistant Examiner

U.S. Cl. X.R.

148—25, 26